US011041578B2

(12) United States Patent
Priisholm et al.

(10) Patent No.: US 11,041,578 B2
(45) Date of Patent: Jun. 22, 2021

(54) SETUP OF VALVE CONTROLLER (71) Applicant: ALFA LAVAL CORPORATE AB, Lund (SE)

(72) Inventors: Thomas Priisholm, Kolding (DK); Karsten Schack Madsen, Odense C (DK); Axel Lund Henriksen, Odense C (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 15/758,198

(22) PCT Filed: Sep. 9, 2016

(86) PCT No.: PCT/EP2016/071348
§ 371 (c)(1),
(2) Date: Mar. 7, 2018

(87) PCT Pub. No.: WO2017/042360
PCT Pub. Date: Mar. 16, 2017

(65) Prior Publication Data
US 2018/0245712 A1  Aug. 30, 2018

(30) Foreign Application Priority Data
Sep. 11, 2015  (EP) ..................................... 15184921

(51) Int. Cl.
*F16K 37/00* (2006.01)
*G05B 19/042* (2006.01)
(Continued)

(52) U.S. Cl.
CPC ...... *F16K 37/0041* (2013.01); *F15B 15/1409* (2013.01); *F16K 1/446* (2013.01);
(Continued)

(58) Field of Classification Search
None
See application file for complete search history.

(56) References Cited

U.S. PATENT DOCUMENTS 3,114,532 A * 12/1963 Gray ..................... F16K 31/408
251/30.01
4,483,360 A * 11/1984 Knappe .................. F16K 1/446
134/166 C
(Continued)

FOREIGN PATENT DOCUMENTS

CN          101878389 A    11/2010
DE          10234482 B3     4/2004
(Continued)

OTHER PUBLICATIONS

International Search Report (PCT/ISA/210) dated Nov. 15, 2016, by the European Patent Office as the International Searching Authority for International Application No. PCT/EP2016/071348.
(Continued)

*Primary Examiner* — Mohammad Ali
*Assistant Examiner* — David Earl Ogg
(74) *Attorney, Agent, or Firm* — Buchanan Ingersoll & Rooney PC (57) ABSTRACT

A valve controller for controlling a valve and a valve comprising the valve controller are disclosed. The valve has an actuator and a flow controlling unit. The valve controller is configured to execute a setup process and comprises a first pilot valve that can energize the actuator by allowing a first pressurized fluid to enter the actuator and de-energizing the actuator by allowing the fluid to leave the actuator. The valve controller further has an input device by which the setup process can be initiated, and a memory unit for storing setup parameter values. The setup process comprises: determining parameter values indicative of the functionality of at least one of the valve controller, the actuator and the flow (Continued)

controlling unit, and storing the parameter values as setup parameter values in the memory unit.

18 Claims, 5 Drawing Sheets

(51) Int. Cl.
*F16K 31/122* (2006.01)
*F16K 1/44* (2006.01)
*F15B 15/14* (2006.01)

(52) U.S. Cl.
CPC ...... *F16K 31/1225* (2013.01); *F16K 37/0075* (2013.01); *F16K 37/0083* (2013.01); *G05B 19/042* (2013.01); *F15B 2211/6336* (2013.01); *G05B 2219/25312* (2013.01); *G05B 2219/25365* (2013.01)

(56) References Cited

U.S. PATENT DOCUMENTS

| | | | |
|---|---|---|---|
| 4,595,979 A * | 6/1986 | Arai | G05B 19/351 |
| | | | 700/69 |
| 5,687,098 A | 11/1997 | Grumstrup et al. | |
| 6,186,163 B1 | 2/2001 | Borg | |
| 6,279,870 B1 | 8/2001 | Welz, Jr. et al. | |
| 7,886,766 B2 | 2/2011 | Radomsky et al. | |
| 8,036,837 B2 | 10/2011 | Wilke | |
| 8,271,141 B2 | 9/2012 | Cummings et al. | |
| 8,915,480 B2 * | 12/2014 | Jakobsen | F15B 21/06 |
| | | | 251/30.02 |
| 9,671,794 B1 * | 6/2017 | Lymberopoulos | E21B 34/02 |
| 2004/0211928 A1 | 10/2004 | Coura et al. | |
| 2006/0108550 A1 | 5/2006 | Burmester | |
| 2006/0219299 A1 | 10/2006 | Snowbarger | |
| 2011/0260085 A1 | 10/2011 | van der Zee et al. | |
| 2012/0167996 A1 | 7/2012 | Pathak et al. | |
| 2013/0248032 A1 * | 9/2013 | Schmidt | F15B 11/006 |
| | | | 137/625.6 |
| 2014/0096850 A1 | 4/2014 | Filkovski et al. | |
| 2014/0116542 A1 | 5/2014 | Feinauer et al. | |
| 2014/0195971 A1 | 7/2014 | Ogata et al. | |
| 2014/0261740 A1 | 9/2014 | Bush | |
| 2014/0305525 A1 * | 10/2014 | Le Moing | F16K 37/0083 |
| | | | 137/553 |
| 2015/0040997 A1 | 2/2015 | Blake et al. | |

FOREIGN PATENT DOCUMENTS

| | | |
|---|---|---|
| EP | 2 755 098 A2 | 7/2014 |
| JP | 2005-337371 A | 12/2005 |
| WO | 02/093058 A1 | 11/2002 |
| WO | 2014/202368 A1 | 12/2014 |

OTHER PUBLICATIONS

Written Opinion (PCT/ISA/237) dated Nov. 15, 2016, by the European Patent Office as the International Searching Authority for International Application No. PCT/EP2016/071348.
U.S. Appl. No. 15/758,252, filed Mar. 7, 2018, Thomas Priisholm et al.
An English Translation of the First Office Action dated Nov. 4, 2019, by the National Intellectual Property Administration, P.R. China in corresponding Chinese Patent Application No. 201680052202. 8. (11 pages).
Gea Tuchenhagen, "Control Module T:VISIX;-AS-Interface", Operating Instructions, Issue Jan. 2003, Part No. 430-285, Nederlands/English, 49 pgs.
Burkert Fluid Control Systems, "Control Head Type 8681" Operating Instructions; printed Jan. 19, 2015; 196 pgs (with English language translation of Operating Instructions for Control Head Type 8681 printed Oct. 5, 2016).
Opposition filed on Aug. 20, 2020 in European Patent Application No. 16763808.9 (17 pages).

* cited by examiner

SETUP OF VALVE CONTROLLER

TECHNICAL FIELD

The present invention relates to fluid valves for controlling flows of fluid. More specifically, the invention relates to the field of devices for controlling fluid valves.

BACKGROUND ART

There are many different types of fluid valves deployed in various industrial applications. Such fluid valves include seat valves of both single-seat type and double-seat type, as well as membrane valves, butterfly valves etc. There are also numerous variants within each specific type of valve. The fluid valves may be designed as on-off valves, changeover valves, mixing valves, pressure regulating valves, control valves, sampling valves, etc.

In industrial applications, fluid valves are arranged to influence and control a process in a targeted manner, e.g. in a process plant. The process plant may thus involve a large number of fluid valves, and each fluid valve typically needs to be precisely controlled to perform a specific task at a specific time.

In order to control the process, it is common to connect the valves to a control network in which a main controller operates to control the operation of the valves. To reduce the demand on the main controller, it is known to provide each fluid valve with a valve controller that is connected to the valve so as to control its operation based on commands or control signals from the main controller. Thus, the valve controller includes some control functions, so that it is operable to recognize and act on the control signals. One such valve controller is described in US2014305525.

Typically, the valve controllers are mechanically, pneumatically and/or electrically connected to the valves to enable the control, with one valve controller for each valve. There are valve controllers that can be used on several variants or types of valves. When installing the valve controller on a specific valve, this typically means that the valve controller has to be adjusted to and paired with the specific valve. Different adjustments and pairings may be required for different valves. This is typically a complicated and time consuming operation.

SUMMARY

It is an object of the invention to at least partly overcome one or more of the above-identified limitations of the prior art. In particular, it is an object to simplify the installment of a valve controller.

To solve these objects, a valve controller is provided for controlling a valve that comprises an actuator and a flow controlling unit comprising a first valve seat and a cooperating first disc that is mechanically coupled to the actuator. The valve controller is configured to execute a setup process and comprises a first pilot valve for energizing the actuator by allowing a first pressurized fluid to enter the actuator and for de-energizing the actuator by allowing the first pressurized fluid to leave the actuator, thereby controlling the position of the first disc. The valve controller further comprises an input device for initiating the setup process, and a memory unit for storing setup parameter values. The setup process comprises the steps of: determining one or more parameter values indicative of the functionality of at least one of the valve controller, the actuator and the flow controlling unit, and storing the one or more parameter values as one or more setup parameter values in the memory unit.

In particular, there is provided a valve controller for controlling a valve. The valve controller is configured to execute a setup process. The valve controller comprises a first pilot valve configured to control the position of a first disc cooperating with a first valve seat to form part of a flow controlling unit of the valve. The first pilot valve is configured to control the position of the first disc by means of energizing an actuator by allowing a first pressurized fluid to enter the actuator and by means of de-energizing the actuator by allowing the first pressurized fluid to leave the actuator. The actuator is mechanically coupled to the first disc. The valve controller also comprises a second pilot valve configured to control the position of the first disc by means of energizing the actuator by allowing a second pressurized fluid to enter the actuator and by means of de-energizing the actuator by allowing the second pressurized fluid to leave the actuator. The first pilot valve and the second pilot valve are configured to move the first disc in opposite directions when the actuator is individually energized by the first pilot valve and the second pilot valve, In other words, the first pilot valve is configured to move the first disc in one direction and the second pilot valve is configured to move the first disc in an opposite direction, i.e. in another direction that is opposite to the direction in which the first pilot valve moves the first disc. The valve controller also comprises a first sensor for providing a sensor reading indicative of the position of the first disc. The valve controller further comprises an input device for initiating the setup process and a memory unit for storing setup parameter values. The setup process is configured to perform the step determining parameter values indicative of the functionality of at least one of the valve controller, the actuator and the flow controlling unit, The step of determining parameter values comprises the sub-step obtaining a first sensor reading from the first sensor when the actuator is de-energized by the first pilot valve, wherein the first sensor reading comprises a first parameter value. The step of determining parameter values also comprises the sub-step obtaining a second sensor reading from the first sensor when the actuator is energized by the first pilot valve, wherein the second sensor reading comprises a second parameter value. The step of determining parameter values further comprises the sub-step obtaining a third sensor reading from the first sensor when the actuator is energized by the second pilot valve, wherein the third sensor reading comprises a third parameter value. The setup process is configured to also perform the step storing the parameter values as setup parameter values in the memory unit.

The memory unit and the setup process of the valve controller are advantageous in that the control of functionality to some extent can be performed by the valve controller itself. Thus, the installment is less dependent on the handling of an installing engineer, which makes the installment simpler and reduces the risk of installment errors.

The input device may be configured to initiate the setup process upon a single command by an operator. Additionally or alternatively, the input device comprises a manually operated switch for providing the single command. This contributes to simplifying the installment of the valve controller.

The determined parameter values may comprise a parameter that indicates if the first pilot valve is responding. Alternatively or additionally, the determined parameter values may comprise a parameter that indicates if the first pilot valve is activated or deactivated.

The step storing the parameter values involves storing the first, second and third parameter values as first, second and third setup parameter values, respectively. The storing implies storing the first parameter value, the second parameter value and the third parameter value as the first setup parameter value, the second setup parameter value and the third setup parameter value, respectively, i.e. storing the first parameter value as the first setup parameter value, the second parameter value as the second setup parameter value and the third parameter value as the third setup parameter value. A sensor reading of the first sensor can be named primary sensor reading. As mentioned above, the step of determining parameter values comprises: obtaining a first sensor reading from the first sensor when the actuator is de-energized by the first pilot valve, wherein the first sensor reading comprises a first parameter value of the parameter values. This means that the first parameter value is an indicator that the valve is at rest. The first parameter value may indicate that the valve is at rest. The first parameter value may indicate that the first disc is at rest. The first parameter value may indicate that the first disc abuts the first valve seat. The first parameter value may indicate that an opening through the first valve seat is closed. The first sensor reading can be named first primary sensor reading.

As mentioned above, the step of determining parameter values further comprises: obtaining a second sensor reading from the first sensor when the actuator is energized by the first pilot valve, wherein the second sensor reading comprises a second parameter value of the parameter values. This means that the second parameter value is an indicator that the valve is activated by the first pilot valve. For example, this can be determined by comparing the second parameter value with the first parameter value obtained when the actuator is de-energized by the first pilot valve. The second parameter value may indicate that the valve is activated by the first pilot valve. The second parameter value may indicate that the actuator is energized by the first pilot valve. The second parameter value may indicate that the first disc is separated from the first valve seat. The second parameter value may indicate that the first disc is lifted, e.g. in a first direction, which may be towards the actuator. The second parameter value may indicate that an opening through the first valve seat is open, e.g. by lifting the first disc in the first direction. The second sensor reading can be named second primary sensor reading.

The step of determining parameter values may comprise prior to obtaining a sensor reading: waiting until the position of the first disc is steady within a preset tolerance. The step of determining one or more parameter values may comprise prior to obtaining a first sensor reading: waiting until the position of the first disc is steady within a preset tolerance.

The step of determining parameter values may comprise prior to the step of obtaining a second sensor reading: waiting until the position of the first disc is steady within a preset tolerance. For example, a preset tolerance may be a movement that is less than 0.5 or 0.1 mm/s in a preset time interval, and the preset time interval may be from e.g. 2 to 10 seconds.

The flow controlling unit comprises the first disc and the first valve seat, since the first disc cooperates with the first valve seat to form part of the flow controlling unit of the valve.

As described above in other words, the valve controller may comprises a second pilot valve for energizing the actuator by allowing a second pressurized fluid to enter the actuator and for de-energizing the actuator by allowing the second pressurized fluid to leave the actuator, thereby controlling the position of the first disc. The actuator may be configured to move the first disc in opposite directions when the actuator is individually energized by the first pilot valve and the second pilot valve. Together, the first pilot valve, the second pilot valve, and the actuator may be configured to move the first disc in opposite directions when the actuator is individually energized by the first pilot valve and the second pilot valve.

As mentioned above, the step of determining parameter values comprises: obtaining a third sensor reading from the first sensor when the actuator is energized by the second pilot valve, wherein the third sensor reading comprises a third parameter value of the parameter values. This means that the third parameter value is an indicator that the actuator is energized by the second pilot valve. The third parameter value may indicate that the actuator is energized by the second pilot valve. The third parameter value may indicate that the valve is activated by the second pilot valve. For example, this can be determined by comparing the third parameter value with the first parameter value obtained when the actuator is de-energized by the first pilot valve. The third parameter value may indicate that the first disc is separated from the first valve seat. The third parameter value may indicate that the first disc is pushed, e.g. in a second direction that is opposite the first direction, which second direction may be away from the actuator. The third parameter value may indicate that an opening through the first valve seat is open, e.g. by pushing the first disc in the second direction. The third sensor reading can be named third primary sensor reading.

The step of determining parameter values may comprise prior to obtaining a third sensor reading: waiting until the position of the first disc is steady within a preset tolerance. For example, a preset tolerance may be a movement that is less than 0.5 or 0.1 mm/s in a preset time interval, and the preset time interval may be e.g. from 2 to 10 seconds.

The valve controller may further comprise a third pilot valve configured to control the position of a second disc cooperating with a second valve seat to form part of the flow controlling unit by means of energizing the actuator that is mechanically coupled to the second disc by allowing a third pressurized fluid to enter the actuator and by means of de-energizing the actuator by allowing the third pressurized fluid to leave the actuator. The valve controller may comprise a second sensor for providing a sensor reading indicating an open or closed state of the second valve seat and the cooperating second disc. The step of determining parameter values may comprise obtaining a fourth sensor reading from the second sensor when the actuator is de-energized by the third pilot valve, wherein the fourth sensor reading comprises a fourth parameter value of the parameter values. When a second valve seat and a cooperating second disc is present, the valve, i.e. the flow controlling unit of the valve, is a double seat valve. The flow controlling unit may comprise the second disc and the second valve seat, since the second disc cooperates with the second valve seat to form part of the flow controlling unit of the valve.

In other words, the flow controlling unit may be a double seat valve and may further comprise a second valve seat and a cooperating second disc that is mechanically coupled to the actuator. Further, the valve controller may comprise a third pilot valve for energizing the actuator by allowing a third pressurized fluid to enter the actuator and for de-energizing the actuator by allowing the third pressurized fluid to leave the actuator, thereby controlling the position of the second disc.

As mentioned above, the valve controller may comprise a second sensor for providing a sensor reading indicating an open or closed state of the second valve seat and the cooperating second disc. A sensor reading of the second sensor can be named secondary sensor reading. As mentioned above, the step of determining parameter values may further comprise: obtaining a fourth sensor reading from the second sensor when the actuator is de-energized by the third pilot valve, wherein the fourth sensor reading comprises a fourth parameter value of the parameter values. The second valve seat and the second valve disc may define a closed state when the actuator is de-energized by the third pilot valve. When the actuator is de-energized also by the first and second pilot valves, this means that the fourth parameter value is an indicator that the valve is at rest. The fourth parameter value may indicate that the valve is at rest. The fourth parameter value may indicate that the second disc is at rest. The fourth parameter value may indicate that the second disc abuts the second valve seat. The fourth parameter value may indicate that an opening through the second valve seat is closed. The fourth sensor reading can be named fourth secondary sensor reading.

The first pilot valve may be configured to control the position of the second disc by means of energizing the actuator by allowing the first pressurized fluid to enter the actuator. In other words, the flow controlling unit may be configured to change the position of the second disc when the actuator is energized by the first pilot valve.

The step of determining parameter values may further comprise: obtaining a fifth sensor reading from the second sensor when the actuator is energized by the first pilot valve, wherein the fifth sensor reading comprises a fifth parameter value of the parameter values. The fifth parameter value may indicate that the valve is activated by the first pilot valve. The fifth parameter value may indicate that the second disc is activated by the first pilot valve. The fifth parameter value may indicate that the second disc is separated from the second valve seat by the first pilot valve. The fifth parameter value may indicate that the second disc is lifted by the first pilot valve, e.g. in the first direction, which may be towards the actuator. The fifth parameter value may indicate that an opening through the second valve seat is open, e.g. by lifting the second disc in the first direction by activating the first pilot valve. The separation and lifting of the second disc may be caused by interaction between the first disc and the second disc, such as caused by the first disc engaging the second disc. The fifth sensor reading can be named fifth secondary sensor reading.

The step of determining parameter values may comprise: obtaining a sixth sensor reading from the second sensor when the actuator is energized by the third pilot valve, wherein the sixth sensor reading comprises a sixth parameter value of the parameter values. This means that the sixth parameter value is an indicator that the valve is activated by the third pilot valve. For example, this can be determined by comparing the sixth parameter value with the fourth parameter value obtained when the actuator is de-energized by the third pilot valve, as described above. The sixth parameter value may indicate that the second disc is activated by the third pilot valve.

The sixth parameter value may indicate that the second disc is separated from the second valve seat by the third pilot valve. The sixth parameter value may indicate that the second disc is lifted by the third pilot valve, e.g. in the first direction, which may be towards the actuator. The sixth parameter value may indicate that an opening through the second valve seat is open, e.g. by lifting the second disc in the first direction by activating the third pilot valve. The sixth sensor reading can be named sixth secondary sensor reading.

The first valve seat and the cooperating first disc may be configured to form a radial seal. The second valve seat and the cooperating second disc may be configured to form an axial seal.

By the above steps involving the first and second sensors, the de-energized and the energized position and the corresponding external sensor states for each and every pilot valve are known. This is typically required to ensure a proper functionality of the valve controller. The involvement of an operator is kept minimal, thus contributing to simplifying the installment of a valve controller.

The valve controller may comprise an indicator for indicating an error condition of the valve controller to an operator. The setup process may further be configured to perform the step: determining if an error condition is fulfilled based on the functionality of at least one of the valve controller, the actuator and the flow controlling unit. If it is determined that an error condition is fulfilled, the setup process is further configured to perform the step: indicating the error condition by the indicator. The setup process can also be considered to comprise the above steps.

The determining of the error condition and the indicating of the error condition by the indicator is advantageous in that the operator can be made aware of the error condition. Thus the operator can take action if an error condition occurs, which contributes to ensuring a proper functionality of the valve controller.

An error condition may be fulfilled if the first pilot valve is not operational. Additionally or alternatively, an error condition may be fulfilled if the first pilot valve is activated at the initiation of the setup process.

The valve controller may comprise a manual override for manually controlling the first pilot valve and an error condition may be fulfilled if the manual override is activated at the initiation of the setup process. Additionally or alternatively, an error condition may be fulfilled if the first sensor is not operational. An error condition may be fulfilled if the first sensor does not indicate a change in position of first disc when the actuator is energized by the first pilot valve.

An error condition may be fulfilled if one or more sensor readings of the first sensor indicate a change in position of the first disc at the start of the setup process. Additionally or alternatively, an error condition may be fulfilled if the second sensor is not operational.

An error condition may be fulfilled if one or more sensor readings by the first sensor indicate a change in position of the first disc that is less than a predetermined change in position when the actuator is energized by the first pilot valve. For example, the predetermined change in position may be 7 mm. Additionally or alternatively, an error condition may be fulfilled if the first sensor indicates a change in position of the first disc when the actuator is energized by the third pilot valve. This indicates that the third pilot valve has not been correctly connected to the actuator.

If the abovementioned one or more sensor readings by the first sensor does not indicate a change in position of the flow controlling unit that is less than a predetermined change in position when the actuator is energized by the first pilot valve, and if the first sensor does not indicate a change in position of the flow controlling unit when the actuator is energized by the third pilot valve, a clear indication may be obtained that all three pilot valves have been correctly connected to the actuator.

According to another aspect, there is provided a valve comprising an actuator, a flow controlling unit and a valve controller as described in the beginning of the summary. The flow controlling unit comprises a first valve seat and a cooperating first disc that is mechanically coupled to the actuator. The valve may comprise all the features and advantages described above in connection with the valve controller and in the rest of the application.

In particular, the valve comprises a valve controller for controlling the valve. The valve controller is configured to execute a setup process. The valve controller comprises a first pilot valve configured to control the position of a first disc cooperating with a first valve seat to form part of a flow controlling unit of the valve. The first pilot valve is configured to control the position of the first disc by means of energizing an actuator by allowing a first pressurized fluid to enter the actuator and by means of de-energizing the actuator by allowing the first pressurized fluid to leave the actuator. The actuator is mechanically coupled to the first disc. The valve controller also comprises a second pilot valve configured to control the position of the first disc by means of energizing the actuator by allowing a second pressurized fluid to enter the actuator and by means of de-energizing the actuator by allowing the second pressurized fluid to leave the actuator. The first pilot valve and the second pilot valve are configured to move the first disc in opposite directions when the actuator is individually energized by the first pilot valve and the second pilot valve. The valve controller also comprises a first sensor for providing a sensor reading indicative of the position of the first disc. The valve controller further comprises an input device for initiating the setup process and a memory unit for storing setup parameter values. The setup process is configured to perform the step determining parameter values indicative of the functionality of at least one of the valve controller, the actuator and the flow controlling unit. The step of determining parameter values comprises the sub-step obtaining a first sensor reading from the first sensor when the actuator is de-energized by the first pilot valve, wherein the first sensor reading comprises a first parameter value. The step of determining parameter values also comprises the sub-step obtaining a second sensor reading from the first sensor when the actuator is energized by the first pilot valve, wherein the second sensor reading comprises a second parameter value. The step of determining parameter values further comprises the sub-step obtaining a third sensor reading from the first sensor when the actuator is energized by the second pilot valve, wherein the third sensor reading comprises a third parameter value. The setup process is configured to also perform the step storing the parameter values as setup parameter values in the memory unit.

In other words, the valve comprises a valve controller for controlling the valve. The flow controlling unit comprises a first valve seat and a cooperating first disc that is mechanically coupled to the actuator. The valve controller is configured to execute a setup process. The valve controller comprises a first pilot valve for energizing the actuator by allowing a first pressurized fluid to enter the actuator and for de-energizing the actuator by allowing the first pressurized fluid to leave the actuator, thereby controlling the position of the first disc. The valve controller also comprises a second pilot valve for energizing the actuator by allowing a second pressurized fluid to enter the actuator and for de-energizing the actuator by allowing the second pressurized fluid to leave the actuator, thereby controlling the position of the first disc. The first pilot valve and the second pilot valve are configured to move the first disc in opposite directions when the actuator is individually energized by the first pilot valve and the second pilot valve. The valve controller also comprises a first sensor for providing a sensor reading indicative of the position of the first disc. The valve controller also comprises an input device for initiating the setup process. The valve controller further comprises a memory unit for storing setup parameter values. The setup process is configured to perform the step determining parameter values indicative of the functionality of at least one of the valve controller, the actuator and the flow controlling unit. The step of determining parameter values comprises the sub-step obtaining a first sensor reading from the first sensor when the actuator is de-energized by the first pilot valve, wherein the first sensor reading comprises a first parameter value. The step of determining parameter values also comprises the sub-step obtaining a second sensor reading from the first sensor when the actuator is energized by the first pilot valve, wherein the second sensor reading comprises a second parameter value. The step of determining parameter values also comprises the sub-step obtaining a third sensor reading from the first sensor when the actuator is energized by the second pilot valve, wherein the third sensor reading comprises a third parameter value. The setup process is also configured to perform the step storing the parameter values as setup parameter values in the memory unit.

According to a further aspect, a method for controlling a valve is provided. The method may comprise all the features and advantages described above in connection with the valve and the valve controller and in the rest of the application.

In particular, the method is a method for controlling a valve comprising a valve controller. The valve controller is configured to execute a setup process. The valve controller comprises a first pilot valve configured to control the position of a first disc cooperating with a first valve seat to form part of a flow controlling unit of the valve. The first pilot valve is configured to control the position of the first disc by means of energizing an actuator by allowing a first pressurized fluid to enter the actuator and by means of de-energizing the actuator by allowing the first pressurized fluid to leave the actuator. The actuator is mechanically coupled to the first disc. The valve controller also comprises a second pilot valve configured to control the position of the first disc by means of energizing the actuator by allowing a second pressurized fluid to enter the actuator and by means of de-energizing the actuator by allowing the second pressurized fluid to leave the actuator. The first pilot valve and the second pilot valve are configured to move the first disc in opposite directions when the actuator is individually energized by the first pilot valve and the second pilot valve. The valve controller also comprises a first sensor for providing a sensor reading indicative of the position of the first disc. The valve controller further comprises an input device for initiating the setup process and a memory unit for storing setup parameter values. The method comprising the step determining parameter values indicative of the functionality of at least one of the valve controller, the actuator and the flow controlling unit, The step of determining parameter values comprises the sub-step obtaining a first sensor reading from the first sensor when the actuator is de-energized by the first pilot valve, wherein the first sensor reading comprises a first parameter value. The step of determining parameter values also comprises the sub-step obtaining a second sensor reading from the first sensor when the actuator is energized by the first pilot valve, wherein the second sensor reading comprises a second parameter value. The step of determining parameter values further comprises the sub-step obtaining a third sensor reading from the first sensor when the actuator is energized by the second pilot valve, wherein the third sensor reading comprises a third parameter value. The method also comprising the step storing the parameter values as setup parameter values in the memory unit.

In other words, the method is a method for controlling a valve, wherein the valve comprises a valve controller, an actuator and a flow controlling unit that comprises a first valve seat and a cooperating first disc that is mechanically coupled to the actuator. The valve controller comprises a first pilot valve for energizing the actuator by allowing a first pressurized fluid to enter the actuator and for de-energizing the actuator by allowing the first pressurized fluid to leave the actuator, thereby controlling the position of the first disc. The valve controller also comprises a second pilot valve for energizing the actuator by allowing a second pressurized fluid to enter the actuator and for de-energizing the actuator by allowing the second pressurized fluid to leave the actuator, thereby controlling the position of the first disc. The first pilot valve and the second pilot valve are configured to move the first disc in opposite directions when the actuator is individually energized by the first pilot valve and the second pilot valve. The valve controller also comprises a first sensor for providing a sensor reading indicative of the position of the first disc. The valve controller also comprises an input device for initiating the setup process, and a memory unit for storing setup parameter values. The method comprises the step determining parameter values indicative of the functionality of at least one of the valve controller, the actuator and the flow controlling unit. The step of determining parameter values comprises the sub-step obtaining a first sensor reading from the first sensor when the actuator is de-energized by the first pilot valve, wherein the first sensor reading comprises a first parameter value of the parameter values. The step of determining parameter values also comprises the sub-step obtaining a second sensor reading from the first sensor when the actuator is energized by the first pilot valve, wherein the second sensor reading comprises a second parameter value of the parameter values. The step of determining parameter values also comprises the sub-step obtaining a third sensor reading from the first sensor when the actuator is energized by the second pilot valve, wherein the third sensor reading comprises a third parameter value of the parameter values. The method also comprises the step storing the parameter values as setup parameter values in the memory unit.

The method and the elements for which the method is applied, such as the valve controller, the actuator and the flow controlling unit, may include the same features as described above in connection with the valve controller.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
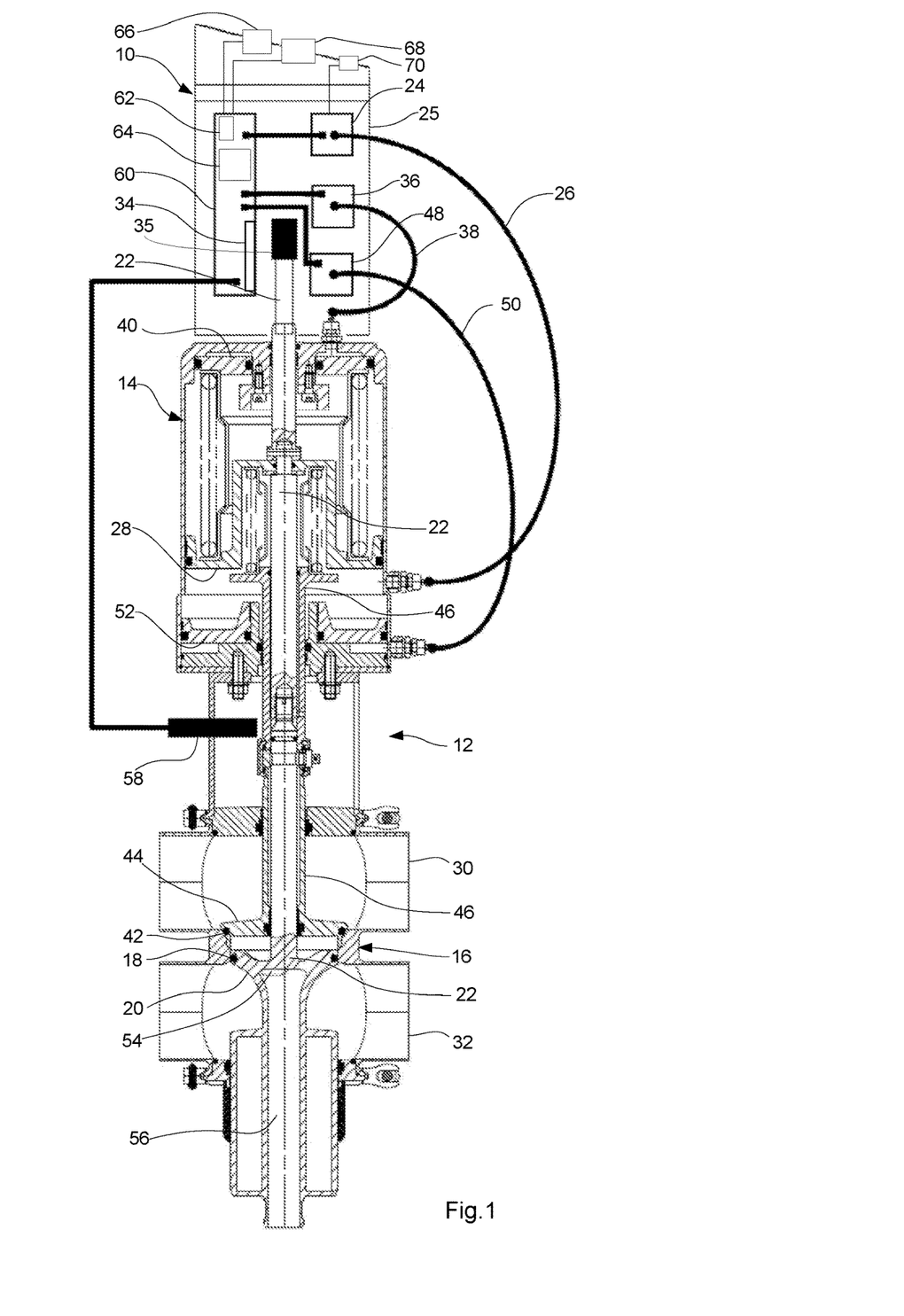
FIG. 1 is a cross-sectional view of an embodiment of a valve controller operatively connected to an actuator and a flow controlling unit.

FIG. 1 is a cross-sectional view of an embodiment of a valve controller 10 operatively connected to an actuator 14 and a flow controlling unit 16. Together the valve controller 10, the actuator 14 and the flow controlling unit 16 form a valve 12.

Figure 2A:
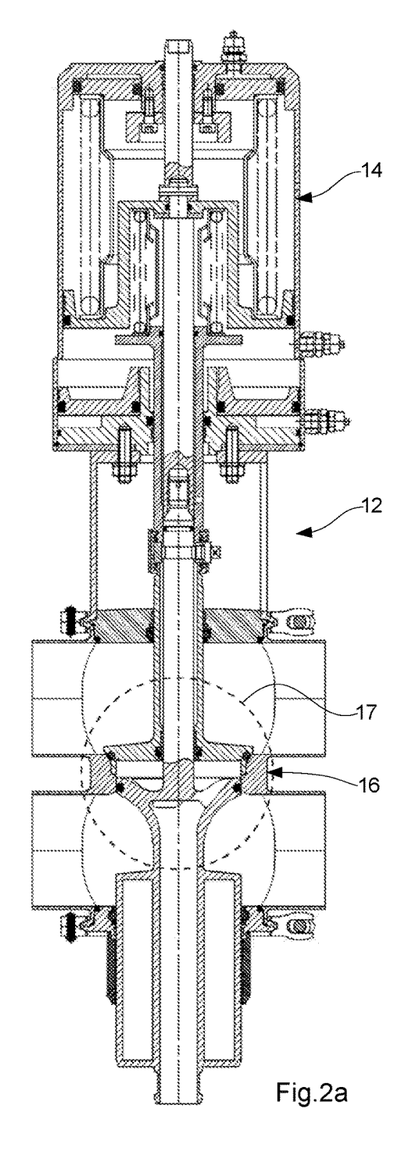
FIG. 2a is a cross-sectional view of the actuator and flow controlling unit of FIG. 1, FIGS. 2b-e are cross sectional views of the flow controlling unit of FIG. 2a illustrating its different function.

FIG. 2a is a view of the actuator 14 and the flow controlling unit 16 and FIGS. 2b-e are enlarged views of the portion of the flow controlling unit 16 indicated by the dashed circle 17, showing the valve 12 when it is in different states. For example, the valve 12 may be an Alfa Laval "Unique Mix proof Valve". Other valves, actuators, and flow controlling units may also be employed.

The flow controlling unit 16 has a first valve seat 18 and a cooperating first disc 20 that is mechanically coupled to the actuator 14 via a first valve stem 22. The valve controller 10 has a first pilot valve 24 located in a housing 25 and the first pilot valve 24 is coupled to the actuator 14 by a first pressure conduit 26. The first pilot valve 24 controls a flow of a first pressurized fluid in the form of pressurized air and allows the pressurized first fluid to enter and energize the actuator 14 via the first pressure conduit 26. The first pilot valve 24 also allows the first pressurized fluid to de-energizing the actuator by allowing the first pressurized fluid to leave the actuator 14 via the first pressure conduit 26.

In the actuator 14, the first pressurized fluid acts on a first actuator disc 28 that is mechanically coupled to the first disc 20 by the first valve stem 22. Thus, when energized by the first pressurized fluid, the actuator 14 lifts the first disc 20 and the flow controlling unit 16 is opened to allow a flow through the first valve seat 18. For example, the flow controlling unit 16 may connect a first pipe section 30 and a second pipe section 32, and when opened by the action of the first pilot valve 24, a flow is allowed between the pipe sections 30 and 32.

Figure 2B:
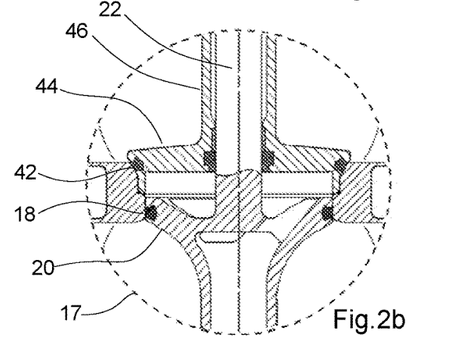

The first actuator disc 28 is spring biased so that the flow controlling unit 16 is closed when the actuator is de-energized by the first pilot valve 24. The position of the first disc 20 relative to the first valve seat 18 is shown in FIG. 2b, and represents a closed state of the valve 12.

The flow controlling unit 16 is a double seat valve. In addition to the first valve seat 18 and the first disc 20, the flow controlling unit 16 has a second valve seat 42 and a cooperating second disc 44 that is mechanically coupled to the actuator 14 via a second valve stem 46. The second valve stem 46 is hollow and the first valve stem 22 is centered on and passes through the second valve stem 46. Thus, the first disc 20 can be positioned further away from the actuator 14 than the second disc 44.

The first valve seat 18 and the cooperating first disc 20 are configured to form a radial seal, and the second valve seat 42 and the cooperating second disc 44 are configured to form an axial seal.

Figure 2C:
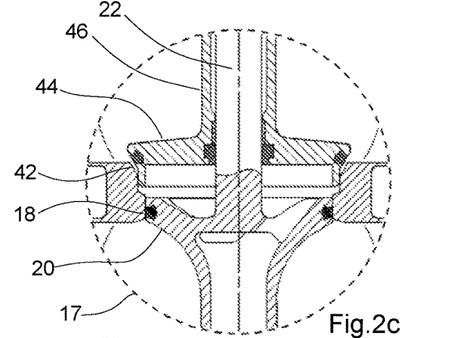
Figure 2D:
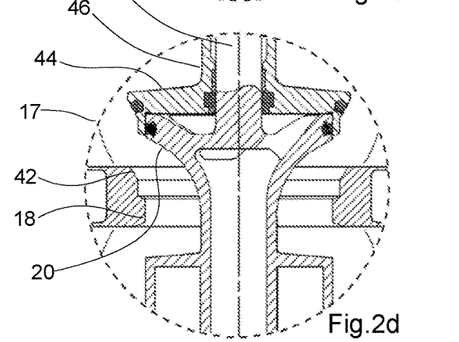

In detail, when the actuator 14 is energized by the first pilot valve 24, the first disc 20 is retracted and engages the second disc 44 so that it is lifted in a direction towards the actuator. Then the first disc 20 disengages the first valve seat 18 and the second disc 44 disengages the second valve seat 42, as is shown in FIG. 2d, which represents an open state of the valve. Thus, the flow controlling unit 10 is configured to change the position of both the first disk 20 and the second disc 44 when the actuator 14 is energized by the first pilot valve 24.

The valve controller 10 has a first sensor 34 that is located in the housing 25 of the valve controller 10 and provides a sensor reading that indicates the position of the first disc 20. In detail, the first sensor 34 comprises a magneto-resistive sensor 34 that reads a location of a magnet 35 that is positioned on a portion of first valve stem 22 that extends from the actuator 14 and into the housing 25 of the valve controller. The position of the first disc 20 is directly related to the position of the first valve stem 22 and the magnet 35, since the first valve stem 22 is connected to the first disc 20.

The valve controller 10 has also a second pilot valve 36 located in the housing 25 and the second pilot valve 36 is coupled to the actuator 14 by a second pressure conduit 38. The second pilot valve 36 controls a flow of a second pressurized fluid in the form of pressurized air and allows the pressurized second fluid to enter and energize the actuator 14 via the second pressure conduit 38. The second pilot valve 36 also allows the second pressurized fluid to de-energize the actuator 14 by allowing the second pressurized fluid to leave the actuator 14 via the second pressure conduit 38.

Figure 2E:
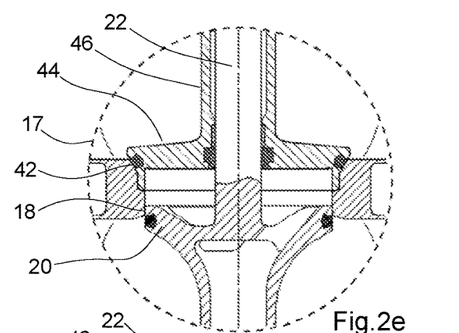

In the actuator 14, the second pressurized fluid acts on a second actuator disc 40 that is mechanically coupled to the first disc 20 by the first valve stem 22. Thus, when energized by the second pressurized fluid, the actuator 14 pushes the first disc 20 and the flow controlling unit 14 is opened to allow a flow past the first valve seat 18. The first disc 20 has an aperture 54 through which the flow can continue and leave the flow controlling unit 16 via an open-ended outlet pipe 56 attached to the first disc 20. This position is shown in FIG. 2e and represents a so called seat push state of the valve 12. During seat push the first valve seat 18 may be cleaned by a cleaning fluid.

The first disc 20 is controlled by the first pilot valve 24 to move in a first, lifting direction, and the second pilot valve 36 controls the first disc to move in a second, pushing direction. Thus the actuator 14 is thereby configured to move the first disc 20 in opposite directions by lifting and pushing when the actuator 14 is individually energized by the first pilot valve 24 and the second pilot valve 36, respectively. The second actuator disc 40 is spring biased so that the first valve seat 18 is sealed when the actuator 14 is de-energized by the second pilot valve 36.

The valve controller 10 has also a third pilot valve 48 that is located in the housing 25 and the third pilot valve 48 is coupled to the actuator 14 by a third pressure conduit 50. The third pilot valve 48 controls a flow of a third pressurized fluid in the form of pressurized air and allows the pressurized first fluid to enter and energize the actuator 14 via the third pressure conduit 50. The third pilot valve 48 also allows the third pressurized fluid to de-energizing the actuator 14 by allowing the third pressurized fluid to leave the actuator 14 via the third pressure conduit 50. The position of the second disc 44 is controlled by the third pilot valve 48.

Specifically, the third pressurized fluid acts on a third actuator disc 52 in the actuator 14. The third actuator disc 52 is mechanically coupled to the second disc 44 by the second valve stem 46. Thus, when energized by the third pressurized fluid, the actuator 14 lifts the second disc 44 and the flow controlling unit 14 is opened to allow a flow past the second valve seat 42. The flow can continue through the aperture 54 and leave the flow controlling unit 16 via the open-ended outlet pipe 56 that is attached to the first disc 20. This position is shown in FIG. 2c and represents a so called seat lift state of the valve 12. During seat lift the second valve seat 42 may be cleaned by a cleaning fluid.

The valve controller 10 has a second sensor 58 located between the actuator 14 and the flow controlling unit 16 and can provide a sensor reading that indicates an open or closed state of the second valve seat 42 and the cooperating second disc 44. Specifically, the second sensor 58 comprises a proximity or inductive sensor that measures on the second valve stem 46, and is thus able to indicate a position of the second valve seat 42.

The valve controller 10 has a control unit 60 with a processor unit 62 and a memory unit 64. The control unit 60 is operatively connected to the first pilot valve 24, the second pilot valve 36, the third pilot valve 48, the first sensor 34, and the second sensor 58 by electrical communication cables to facilitate communication and control of these components. The memory unit 64 can store a number of setup parameter values and computer program instructions that, when executed by the processor unit 62, causes the valve controller 10 to perform a setup process, thus configuring the valve controller 10 to execute the setup process.

The valve controller 10 is fitted with an input device 66 that is operatively connected to the control unit 60 and by which by the setup process can be initiated. In the present embodiment, the input device 66 is configured to initiate the setup process upon a single command by an operator, and has a manually operated switch by which the single command can be provided.

The valve controller 10 is also fitted with an indicator 68 in the form of LED-lights that can visually indicate an error condition of the valve controller 10 to an operator, and a manual override 70 in the form of a manual switch for manually controlling the first pilot valve 24.

Figure 3:
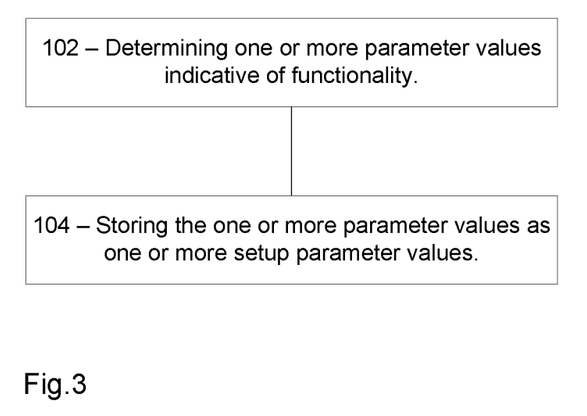
FIG. 3 is a flow-chart illustrating an embodiment of a setup process.

FIG. 3 is a flow-chart illustrating an embodiment of the setup process, which includes the steps of determining 102 one or more parameter values indicative of the functionality of at least one of the valve controller 10, the actuator 14 and the flow controlling unit 16, and storing 104 the one or more parameter values as one or more setup parameter values in the memory unit 64. The setup parameter values may be used in subsequent operation of the valve 12 for verifying that it operates as intended. In a further embodiment, the one or more parameter values includes a parameter that indicates if the first pilot valve 24 is responding, or that indicates if the first pilot valve 24 is activated or deactivated.

Figure 4:
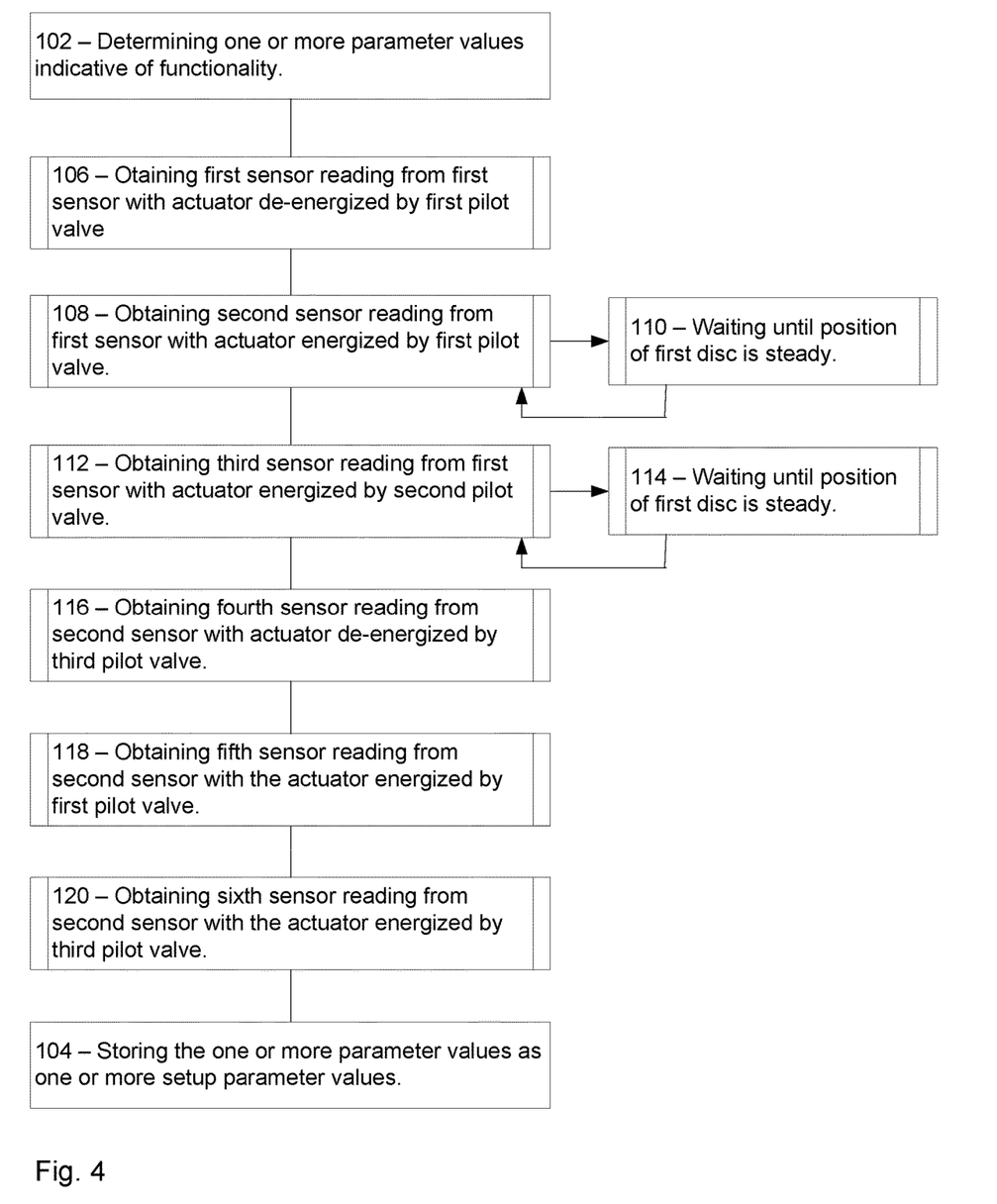
FIG. 4 is a flow-chart illustrating another embodiment of a setup process.

FIG. 4 is a flow-chart illustrating an alternative embodiment of the setup process described in connection with FIG. 3, in which the step of determining 102 one or more parameter values includes a number of sub-steps.

A first sub-step includes obtaining 106 a first sensor reading from the first sensor 34 with the actuator 14 de-energized by the first pilot valve 24. This is followed by a second sub-step that includes waiting 110 until the position of the first disc 20 is steady within a preset (predetermined) tolerance interval and obtaining 108 a second sensor reading from the first sensor 34 with the actuator 14 energized by the first pilot valve 24. The first sensor 34 is employed to determine that the position of the first disc 20 is steady within the preset tolerance interval. For example, a preset tolerance interval may correspond a movement that is less than 0.5 or 0.1 mm/s in a preset time interval, where the preset time interval may be from 2 to 10 s. This is followed by a third sub-step that includes waiting 114 until the position of the first disc 20 is steady within a preset tolerance interval and obtaining 112 a third sensor reading from the first sensor 34 with the actuator 14 energized by the second pilot valve 36. The preset tolerance interval may be the same as the one defined above.

As a fourth sub-step, a fourth sensor reading from the second sensor 58 is obtained 116 with the actuator 14 de-energized by the third pilot valve 48. As a fifth sub-step, a fifth sensor reading from the second sensor 58 is obtained 118 with the actuator 14 energized by the first pilot valve 24. As a sixth sub-step, a sixth sensor reading from the second sensor 58 is obtained 120 with the actuator 14 energized by the third pilot valve 48.

In the above sub-steps, each of the sensor readings (first to sixth) comprises a parameter value of the one or more parameter values.

Figure 5:
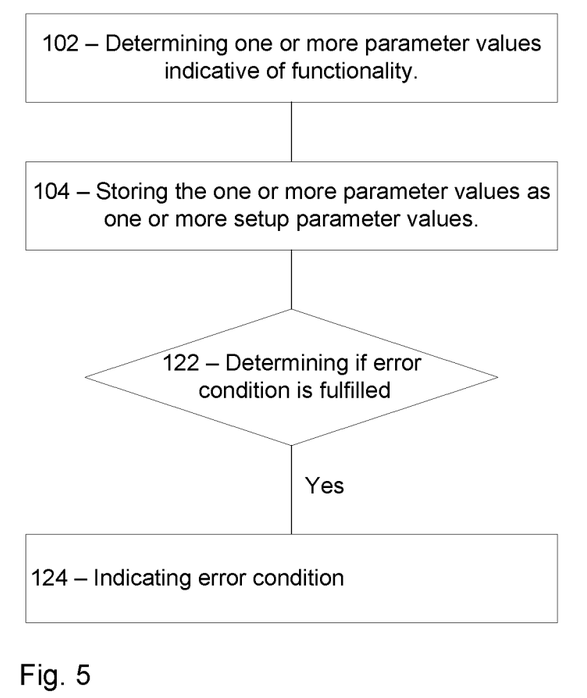
FIG. 5 is a flow-chart illustrating another embodiment of a setup process.

FIG. 5 is a flow-chart illustrating an alternative embodiment of the setup process described in relation to FIG. 3 in which it further includes the step of determining 122 if an error condition is fulfilled based on the functionality of at least one of the valve controller 10, the actuator 14 and the flow controlling unit 16. If it is determined that an error condition is fulfilled, the setup process further comprises the step of indicating 124 the error condition by the indicator 68.

An error condition is fulfilled if the first pilot valve 24 is not operational. For example, this may be the case if the first pilot valve 24 has not been correctly installed or is missing. In one embodiment, the condition is determined by measuring a voltage over an electrical communication cable connecting the first pilot valve 24 to the control unit 60, where the measured voltage indicates the presence of first pilot valve 24. In another embodiment, the condition is fulfilled if there is a parameter value in the memory 64 that indicates that the first pilot valve 24 is not responding.

An error condition is also fulfilled if the first pilot valve 24 already activated at the initiation of the setup process. In one embodiment, this condition is determined by controlling if there is a parameter value in the memory 64 that indicates that the first pilot valve 24 is activated. Such a parameter is described above in relation to FIG. 3.

Additionally, an error condition is fulfilled if the manual override 70 is activated at the initiation of the setup process. In one embodiment, this condition is determined if a change in position is detected by the first sensor 34 without the control unit 60 giving a command to the first pilot valve 24 to energize the actuator 14.

Another error condition is fulfilled if the first sensor 34 is not operational. For example, this may be the case if the magnet 35 of the first sensor 34 is missing. In one embodiment, this condition is determined if no position is detected by the first sensor 34. Yet another error condition is considered fulfilled if the first sensor 34 does not indicate a change in position of the first disc when the actuator 14 is energized by the first pilot valve 24. For example, this may happen if the first pressure conduit 26 is missing.

An error condition is also fulfilled if one or more sensor readings of the first sensor 34 indicate a change in position of the first valve disc 20 (i.e. a change in the stem 22 and thus the magnet 35) when the first pilot valve 24 is activated. For example, this may indicate a leakage in the first pressure conduit 26 or that the first pressure conduit 26 is not properly connected.

An error condition is also fulfilled if one or more sensor readings by the first sensor 34 indicate a change in position of the first disc 20 that is less than a predetermined change in position when the actuator 14 is energized by the first pilot valve 24. For example, the predetermined change in position may be 7 mm and in a predetermined direction towards the actuator 14. This indicates that the first pilot valve 24 has not been correctly connected to the actuator. For example, it may energize the actuator 14 by the second actuator disc 40 instead of the first actuator disc 28. Further, an error condition is considered fulfilled if the first sensor 34 indicates a change in position of the first disc 20 when the actuator 14 is energized by the third pilot valve 48. If the abovementioned one or more sensor readings by the first sensor 34 does not indicate a change in position of the first disc 20 that is less than a predetermined change in position when the actuator 14 is energized by the first pilot valve 24, and if the first sensor 34 does not indicates a change in position of the first disc 20 when the actuator is energized by the third pilot valve, then it may be assumed that all three pilot valves 24, 36, and 48 have been correctly connected to the actuator 14.

Another error condition is considered fulfilled if the second sensor 58 is not operational. For example, this may be the case if the second sensor 58 has not been correctly installed or is missing. In one embodiment, this condition is determined by measuring a voltage over an electrical communication cable connecting the second sensor 58 to the control unit 60, where a successfully measured voltage indicates the presence of the second sensor 58. In another embodiment, the condition is fulfilled if there is a parameter value in the memory 64 that indicates that the second sensor 58 is not responding.

Figure 6:
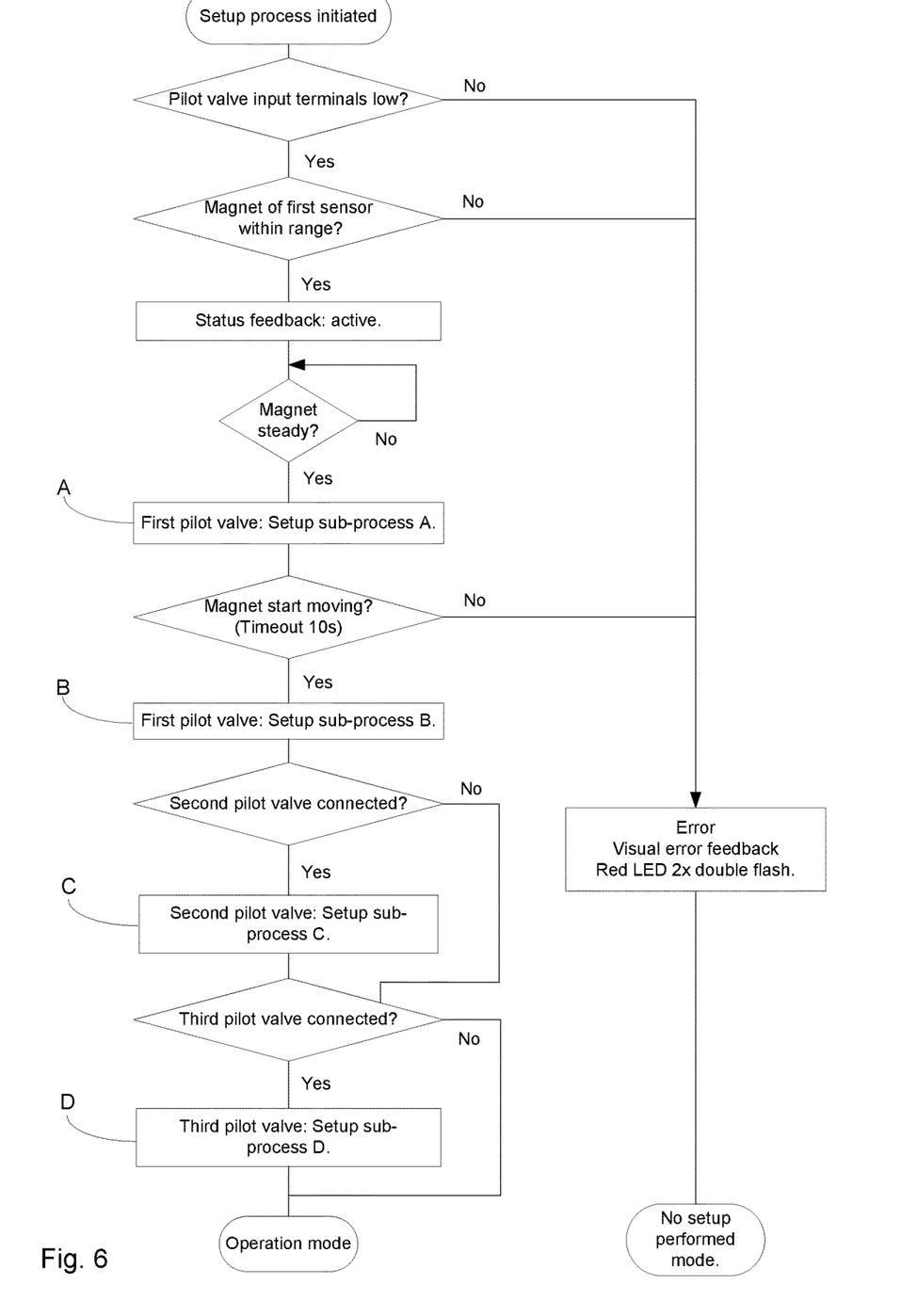
FIG. 6 is a flow-chart illustrating yet another embodiment of a setup process.

FIG. 6 is flow-chart illustrating a setup process that can be implemented by the valve controller 10 described in relation to FIGS. 1 and 2. The setup process involves a number of setup sub-processes, of which one or more may be used, in full or partly, in the methods described in connection with FIGS. 3, 4 and 5. Setup sub-process A includes taking a reading with the first sensor with the actuator 14 de-energized by the first pilot valve 24, the second pilot valve 36 and the third pilot valve 48 and storing the result as a parameter value. This is followed by an activation of the first pilot valve 24 and a signaling of a fast toggling of a yellow LED by the indicator 68.

The subsequent setup sub-process B includes waiting until the magnet 35 of the first sensor 34 is steady and taking a reading with the first sensor with the actuator 14 energized by the first pilot valve 24 and storing the result as a parameter value. This is followed by a yellow LED double-flash signaling two times by the indicator 68. The actuator 14 is then de-energized by the first pilot valve 24, and a fast toggling green LED signaling by the indicator 68 is performed. Setup sub-process B continues with waiting until the magnet of the first sensor 34 is steady within a default tolerance interval of the de-energized position. The default tolerance is defined by a position change that is less than 0.1 mm. If this is not achieved after 10 s, an error condition is determined. Otherwise, a green LED double-flash is two times signaled by the indicator 68.

Setup sub-process C includes energizing the actuator 14 by the second pilot valve 36 and signaling by the indicator a fast toggling of a blue LED. The setup sub-process C further includes determining if the magnet of the first sensor 34 starts to move with a timeout of 10 s. If not, an error condition is determined. Otherwise, the setup sub-process C continues with waiting until the magnet is steady, whereafter a reading with the first sensor is performed with the actuator 14 energized by the second pilot valve 36, and the result is stored as a parameter value. Subsequently, a blue LED double-flash is indicated two times by the indicator 68. The actuator 14 is de-energized by second pilot valve 36 and a fast toggling of green LED is signaled by the indicator 68. The setup sub-process C continues with waiting until the magnet is steady within a default tolerance band of the de-energized position. The default tolerance is defined by a position change that is less than 0.1 mm. If this is not achieved at timeout of 10 s, an error condition is determined. Otherwise, a green LED double-flash is two times signaled by the indicator 68.

Setup sub-process C includes energizing the actuator 14 by the second pilot valve 36 and signaling by the indicator a fast toggling of a blue LED. The setup sub-process C further includes determining if the magnet of the first sensor 34 starts to move with a timeout of 10 s. If not, an error condition is determined. Otherwise, the setup sub-process C continues with waiting until the magnet is steady, whereafter the position of the first disc 20 is determined and saved as a parameter value with the first sensor 34 and a blue LED double-flash is indicated two times by the indicator 68. The actuator 14 is de-energized by second pilot valve 36 and a fast toggling of green LED is signaled by the indicator 68. The setup sub-process C continues with waiting until the magnet 35 is steady within a default tolerance band of the de-energized position. The default tolerance is defined by a position change that is less than 0.1 mm. If this is not achieved at timeout of 10 s, an error condition is determined. Otherwise, a green LED double-flash is two times signaled by the indicator 68.

Setup sub-process D includes energizing the actuator 14 by the third pilot valve 48 and signaling by the indicator a fast toggling of a purple LED. The setup sub-process D continues with waiting until the second sensor 58 indicates a changed in state and storing the indication as a parameter value indicating that the second disc 44 is open. This is followed by the indicator 68 signaling a purple LED double-flash two times. The actuator 14 is de-activated by the third pilot valve 48. The Setup sub-process D is continued by waiting for the second sensor 58 to indicate a change in state. If this does not occur within 10 s, an error condition is determined. Otherwise, the indicator 68 signals a green LED double-flash two times.

In all of the above embodiments, the first, second, and third pilot valves may be a solenoid valve. The solenoid valve may be closed when inactive and open when activated. Further, they may be coupled to a central compressor system for providing the first pressurized fluid, the second pressurized fluid, and the third pressurized fluid.

From the description above follows that, although various embodiments of the invention have been described and shown, the invention is not restricted thereto, but may also be embodied in other ways within the scope of the subject-matter defined in the following claims.

The invention claimed is:

1. A valve controller for controlling a valve, the valve controller being configured to execute a setup process and comprising:
 a first pilot valve configured to control the position of a first disc cooperating with a first valve seat to form part of a flow controlling unit of the valve by means of energizing an actuator that is mechanically coupled to the first disc by allowing a first pressurized fluid to enter the actuator and by means of de-energizing the actuator by allowing the first pressurized fluid to leave the actuator,
 a second pilot valve configured to control the position of the first disc by means of energizing the actuator by allowing a second pressurized fluid to enter the actuator and by means of de-energizing the actuator by allowing the second pressurized fluid to leave the actuator, wherein the first pilot valve and the second pilot valve are configured to move the first disc in opposite directions when the actuator is individually energized by the first pilot valve and the second pilot valve,
 a third pilot valve configured to control the position of a second disc cooperating with a second valve seat forming part of the flow controlling unit by way of energizing the actuator that is mechanically coupled to the second disc by allowing a third pressurized fluid to enter the actuator and by way of de-energizing the actuator by allowing the third pressurized fluid to leave the actuator,
 the first, second and third pilot valves being different from one another,
 a first sensor for providing a sensor reading indicative of the position of the first disc,
 a second sensor that provides a sensor reading indicating an open or closed state of the second valve seat and the cooperating second disc,
 an input device for initiating the setup process, and
 a memory unit for storing setup parameter values,
 the setup process being configured to perform the following steps when the setup process is initiated by way of the input device:
 determining parameter values indicative of the functionality of at least one of the valve controller, the actuator and the flow controlling unit, the step of determining parameter values comprising the sub-steps:
  obtaining a first sensor reading from the first sensor when the actuator is de-energized by the first pilot valve, wherein the first sensor reading comprises a first parameter value,
  obtaining a second sensor reading from the first sensor when the actuator is energized by the first pilot valve, wherein the second sensor reading comprises a second parameter value, and
  obtaining a third sensor reading from the first sensor when the actuator is energized by the second pilot valve, wherein the third sensor reading comprises a third parameter value;
  obtaining a fourth sensor reading from the second sensor when the actuator is de-energized by the third pilot valve, wherein the fourth sensor reading comprises a fourth parameter value, and
 storing the first, second, third and fourth parameter values as setup parameter values in the memory unit.

2. The valve controller according to claim 1, wherein the first parameter value indicates that the valve is at rest, the second parameter value indicates that the valve is activated by the first pilot valve and the third parameter value indicates that the valve is activated by the second pilot valve.

3. The valve controller according to claim 1, wherein the first pilot valve is configured to control the position of the second disc by means of energizing the actuator by allowing the first pressurized fluid to enter the actuator, and the step of determining parameter values comprises:
 obtaining a fifth sensor reading from the second sensor when the actuator is energized by the first pilot valve, wherein the fifth sensor reading comprises a fifth parameter value.

4. The valve controller according to claim 3, wherein the step of determining parameter values comprises:
 obtaining a sixth sensor reading from the second sensor when the actuator is energized by the third pilot valve, wherein the sixth sensor reading comprises a sixth parameter value.

5. The valve controller according to claim 1, wherein the input device is configured to initiate the setup process upon a single command by an operator.

6. The valve controller according to claim 1 further comprising:
an indicator for indicating an error condition of the valve controller to an operator,
the setup process being configured to perform the further steps:
determining if an error condition is fulfilled based on the functionality of at least one of the valve controller, the actuator and the flow controlling unit, and
indicating, if it is determined that the error condition is fulfilled, the error condition by the indicator.

7. The valve controller according to claim 6, wherein an error condition is fulfilled if the first pilot valve is activated before the initiation of the setup process.

8. The valve controller according to claim 6, wherein the valve controller comprises a manual override for manually activating the first pilot valve, and an error condition is fulfilled if the manual override is activated at the initiation of the setup process.

9. The valve controller according to claim 6, wherein an error condition is fulfilled if the first sensor does not indicate a change in position of the first disc when the actuator is energized by the first pilot valve.

10. The valve controller according to claim 6, wherein an error condition is fulfilled if one or more sensor readings of the first sensor indicate a change in position of the first disc before the start of the setup process.

11. The valve controller according to claim 6, wherein an error condition is fulfilled if one or more sensor readings by the first sensor indicate, when the actuator is energized by the first pilot valve, a change in position of the first disc that is less than a predetermined change in position.

12. A valve comprising an actuator, a flow controlling unit and a valve controller according to claim 1, wherein the flow controlling unit comprises a first valve seat and a cooperating first disc that is mechanically coupled to the actuator.

13. A method for controlling a valve that comprises a valve controller, an actuator and a flow controlling unit, the flow controlling unit comprising a first valve seat and a cooperating first disc that is mechanically coupled to the actuator, the flow controlling unit also comprising a second disc mechanically coupled to the actuator and cooperating with a second valve seat, the valve controller comprising:
a first pilot valve for energizing the actuator by allowing a first pressurized fluid to enter the actuator and for de-energizing the actuator by allowing the first pressurized fluid to leave the actuator, thereby controlling the position of the first disc,
a second pilot valve for energizing the actuator by allowing a second pressurized fluid to enter the actuator and for de-energizing the actuator by allowing the second pressurized fluid to leave the actuator, thereby controlling the position of the first disc, wherein the first pilot valve and the second pilot valve are configured to move the first disc in opposite directions when the actuator is individually energized by the first pilot valve and the second pilot valve,
a third pilot valve configured to control the position of the second disc cooperating by way of energizing the actuator that is mechanically coupled to the second disc by allowing a third pressurized fluid to enter the actuator and by way of de-energizing the actuator by allowing the third pressurized fluid to leave the actuator,
the first, second and third pilot valves being different from one another,
a first sensor for providing a sensor reading indicative of the position of the first disc,
a second sensor that provides a sensor reading indicating an open or closed state of the second valve seat and the cooperating second disc,
an input device for initiating the setup process, and
a memory unit for storing setup parameter values,
the method comprising the steps:
determining parameter values indicative of the functionality of at least one of the valve controller, the actuator and the flow controlling unit, the step of determining parameter values comprising the sub-steps:
obtaining a first sensor reading from the first sensor when the actuator is de-energized by the first pilot valve, wherein the first sensor reading comprises a first parameter value,
obtaining a second sensor reading from the first sensor when the actuator is energized by the first pilot valve, wherein the second sensor reading comprises a second parameter value, and
obtaining a third sensor reading from the first sensor when the actuator is energized by the second pilot valve, wherein the third sensor reading comprises a third parameter value;
obtaining a fourth sensor reading from the second sensor when the actuator is de-energized by the third pilot valve, wherein the fourth sensor reading comprises a fourth parameter value; and
storing the first, second, third and fourth parameter values as setup parameter values in the memory unit.

14. A valve controller for controlling a valve, the valve controller being configured to execute a setup process and comprising:
a first pilot valve that controls a position of a first disc that cooperates with a first valve seat forming part of a flow controlling unit of the valve that is positioned between two spaced apart pipe sections to control fluid flow between the two pipe sections, the first pilot valve energizing an actuator that is mechanically coupled to the first disc to control the position of the first disc by allowing a first pressurized fluid to enter the actuator at a location causing the first disc to move in a first direction, the first pilot valve de-energizing the actuator by allowing the first pressurized fluid to leave the actuator;
a second pilot valve that controls the position of the first disc, the second pilot valve energizing the actuator to control the position of the first disc by allowing a second pressurized fluid to enter the actuator at a location causing the first disc to move in a second direction opposite the first direction, the second pilot valve de-energizing the actuator by allowing the second pressurized fluid to leave the actuator, the location at which the second pressurized fluid is introduced into the actuator being different from the location at which the first pressurized fluid is introduced into the actuator;
a third pilot valve that controls the position of a second disc that cooperates with a second valve seat forming part of the flow controlling unit, the third pilot valve controlling the position of the second disc by energizing the actuator that is mechanically coupled to the second disc and by de-energizing the actuator, the third pilot valve energizing the actuator by allowing a third pressurized fluid to enter the actuator at a location that moves the second disc in the first direction, the third pilot valve de-energizing the actuator by allowing the third pressurized fluid to leave the actuator, the first, second and third pilot valves being different from one another, the flow controlling unit including a passage that connects the two pipe sections, the first valve seat being adjacent one end of the passage and the second valve seat being adjacent an opposite end of the passage, the passage being open and the two pipe sections being in communication with one another in an open state of the first and second valve seats and the cooperating first and second discs respectively in which the first and second discs are spaced from the first and second valve seats respectively, the passage being closed and the two pipe sections being prevented from communicating with one another in a closed state of the first and second valve seats and the cooperating first and second discs respectively in which when the first and second discs cooperate with first and second valve seats respectively, a first sensor that identifies the position of the first disc and provides a sensor reading about the position of the first disc;

a second sensor that provides a sensor reading indicating the open or closed state of the second valve seat and the cooperating second disc, an input device configured to initiate the setup process;

a memory unit for storing setup parameter values;

the setup process being configured, when the setup process is initiated by way of the input device, to:
  determine parameter values indicative of functionality of at least one of the valve controller, the actuator and the flow controlling unit, the determining of the parameter values comprising:
    obtaining a first sensor reading from the first sensor when the actuator is de-energized by the first pilot valve, the first sensor reading comprising a first parameter value;
    obtaining a second sensor reading from the first sensor when the actuator is energized by the first pilot valve, the second sensor reading comprising a second parameter value;
    obtaining a third sensor reading from the first sensor when the actuator is energized by the second pilot valve, the third sensor reading comprising a third parameter value;
    obtaining a fourth sensor reading from the second sensor when the actuator is de-energized by the third pilot valve, wherein the fourth sensor reading comprises a fourth parameter value; and
  storing the first, second, third and fourth parameter values as setup parameter values in the memory unit.

15. The method for controlling a valve according to claim 13, further comprising:
  determining that an error condition is fulfilled whenever the first pilot valve is activated before the initiation of the setup process, and
  indicating the error condition to an operator, by way of an indicator, whenever the error condition is determined to be fulfilled.

16. The method for controlling a valve according to claim 13, further comprising:
  determining that an error condition is fulfilled whenever one or more sensor readings of the first sensor indicate a change in position of the first disc before the initiation of the setup process, and
  indicating the error condition to an operator, by way of an indicator, whenever the error condition is determined to be fulfilled.

17. A valve controller for controlling a valve, the valve controller being configured to execute a setup process and comprising:
  a first pilot valve configured to control the position of a first disc cooperating with a first valve seat to form part of a flow controlling unit of the valve by means of energizing an actuator that is mechanically coupled to the first disc by allowing a first pressurized fluid to enter the actuator and by means of de-energizing the actuator by allowing the first pressurized fluid to leave the actuator,
  a second pilot valve configured to control the position of the first disc by means of energizing the actuator by allowing a second pressurized fluid to enter the actuator and by means of de-energizing the actuator by allowing the second pressurized fluid to leave the actuator, wherein the first pilot valve and the second pilot valve are configured to move the first disc in opposite directions when the actuator is individually energized by the first pilot valve and the second pilot valve,
  the first, second and third pilot valves being different from one another,
  a first sensor for providing a sensor reading indicative of the position of the first disc,
  an input device for initiating the setup process, and
  a memory unit for storing setup parameter values,
  the setup process being configured to perform the following steps whenever the setup process is initiated by way of the input device:
  determining parameter values indicative of the functionality of at least one of the valve controller, the actuator and the flow controlling unit, the step of determining parameter values comprising the sub-steps:
    obtaining a first sensor reading from the first sensor when the actuator is de-energized by the first pilot valve, wherein the first sensor reading comprises a first parameter value,
    obtaining a second sensor reading from the first sensor when the actuator is energized by the first pilot valve, wherein the second sensor reading comprises a second parameter value, and
    obtaining a third sensor reading from the first sensor when the actuator is energized by the second pilot valve, wherein the third sensor reading comprises a third parameter value;
  storing the parameter values as setup parameter values in the memory unit,
  determining that an error condition is fulfilled whenever the first pilot valve is activated before the initiation of the setup process, and
  indicating the error condition to an operator, by way of an indicator, whenever the error condition is determined to be fulfilled.

18. A valve controller for controlling a valve, the valve controller being configured to execute a setup process and comprising:
  a first pilot valve configured to control the position of a first disc cooperating with a first valve seat to form part of a flow controlling unit of the valve by means of energizing an actuator that is mechanically coupled to the first disc by allowing a first pressurized fluid to enter the actuator and by means of de-energizing the actuator by allowing the first pressurized fluid to leave the actuator, a second pilot valve configured to control the position of the first disc by means of energizing the actuator by allowing a second pressurized fluid to enter the actuator and by means of de-energizing the actuator by allowing the second pressurized fluid to leave the actuator, wherein the first pilot valve and the second pilot valve are configured to move the first disc in opposite directions when the actuator is individually energized by the first pilot valve and the second pilot valve, the first, second and third pilot valves being different from one another, a first sensor for providing a sensor reading indicative of the position of the first disc, an input device for initiating the setup process, and a memory unit for storing setup parameter values, the setup process being configured to perform the following steps whenever the setup process is initiated by way of the input device:

determining parameter values indicative of the functionality of at least one of the valve controller, the actuator and the flow controlling unit, the step of determining parameter values comprising the sub-steps:

obtaining a first sensor reading from the first sensor when the actuator is de-energized by the first pilot valve, wherein the first sensor reading comprises a first parameter value, obtaining a second sensor reading from the first sensor when the actuator is energized by the first pilot valve, wherein the second sensor reading comprises a second parameter value, and obtaining a third sensor reading from the first sensor when the actuator is energized by the second pilot valve, wherein the third sensor reading comprises a third parameter value;

storing the parameter values as setup parameter values in the memory unit, determining that an error condition is fulfilled whenever one or more sensor readings of the first sensor indicate a change in position of the first disc before the initiation of the setup process, and indicating the error condition to an operator, by way of an indicator, whenever the error condition is determined to be fulfilled.

* * * * *